United States Patent [19]

Meacock, II et al.

[11] 3,966,009
[45] June 29, 1976

[54] VEHICLE CAB MOUNTING ARRANGEMENT

[75] Inventors: Leslie A. Meacock, II, Emmaus; Donald R. Schumaker, Allentown; Robert F. Zalokar, Emmaus, all of Pa.

[73] Assignee: Mack Trucks, Inc., Allentown, Pa.

[22] Filed: Dec. 17, 1974

[21] Appl. No.: 533,548

[52] U.S. Cl. ............................. 180/89 A; 180/41; 296/28 C; 296/35 R; 280/712
[51] Int. Cl.² ........................................ B62D 33/06
[58] Field of Search .............. 180/89 A, 89 R, 41; 296/28 C, 35 R; 280/106.5 P, 124 F; 267/65 R

[56] References Cited
UNITED STATES PATENTS

| | | | |
|---|---|---|---|
| 3,010,757 | 11/1961 | De Haan | 296/35 R |
| 3,276,812 | 10/1966 | Fisher | 296/35 R |
| 3,361,444 | 1/1968 | Harbers | 296/35 R |
| 3,442,502 | 5/1969 | Fischer et al. | 267/65 |
| 3,642,316 | 2/1972 | Porth, et al. | 180/89 A |
| 3,831,999 | 8/1974 | Sonneborn | 180/89 A |
| 3,841,694 | 10/1974 | Merkle | 296/35 R |
| 3,847,244 | 11/1974 | Fairbanks, Jr. | 180/89 A |
| 3,853,368 | 12/1974 | Eichelsheim | 180/89 A |

OTHER PUBLICATIONS

"Truck Ride Guide", William F. LeFerve, c. 1967 by Rockwell-Standard Corporation, Detroit, Michigan, pp. 30, 31 and 73.

*Primary Examiner*—M. H. Wood, Jr.
*Assistant Examiner*—Jack D. Rubenstein
*Attorney, Agent, or Firm*—Brumbaugh, Graves, Donohue & Raymond

[57] ABSTRACT

A vehicle includes a cab mounted on a frame capable of vibratory, beam-like bending about at least one nodal point. To minimize the fore and aft motion of the cab caused by the vibratory bending of the frame and by pitching of the vehicle, while reducing vertical motion of the cab, one portion of the cab is resiliently mounted on the frame at or near a nodal point. Preferably, the resilient mount includes at least one pneumatic spring. Another portion of the cab is secured to the frame by a pivotal support that transmits to the cab vibratory movement of the frame at the support.

4 Claims, 5 Drawing Figures

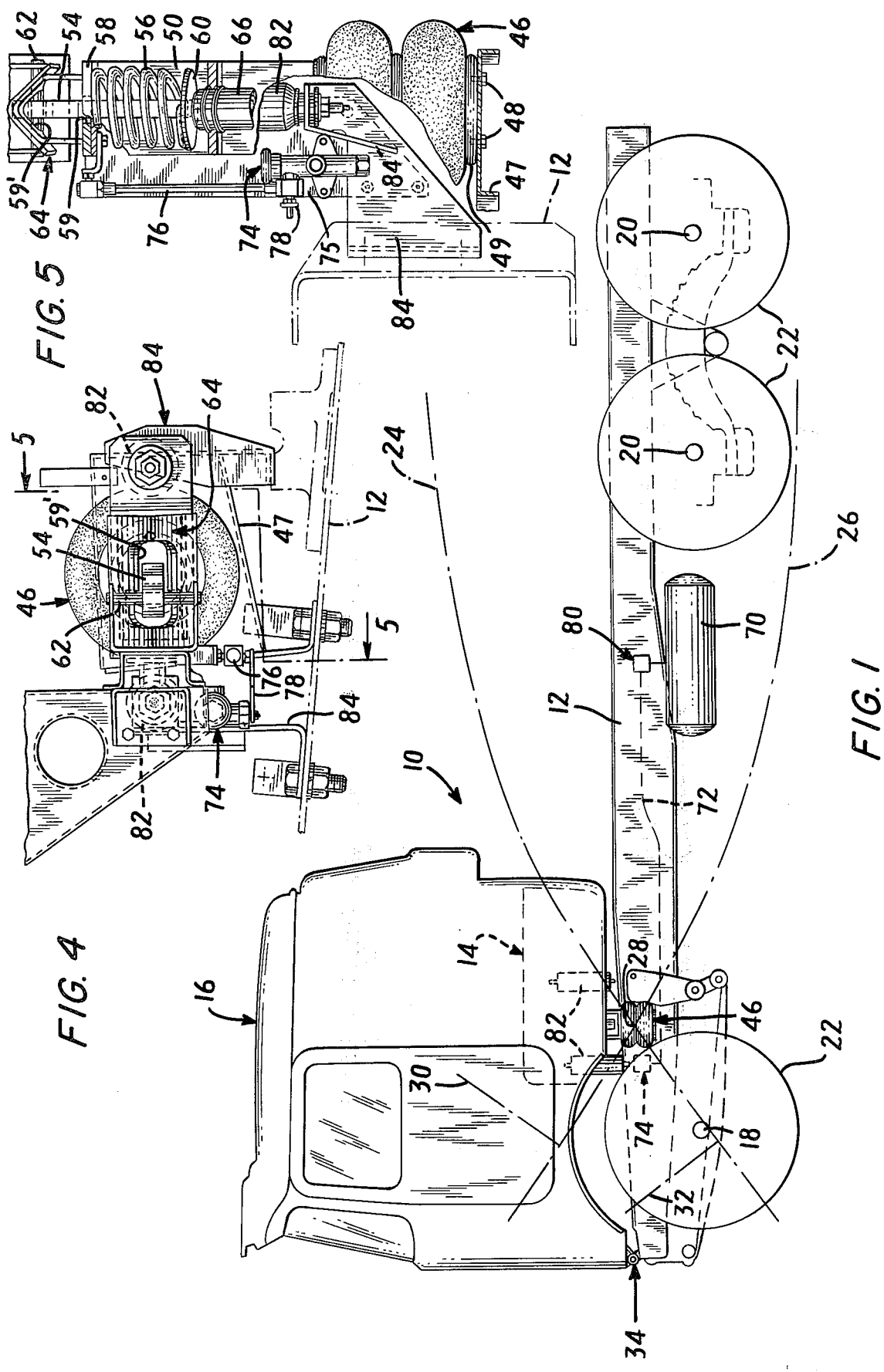

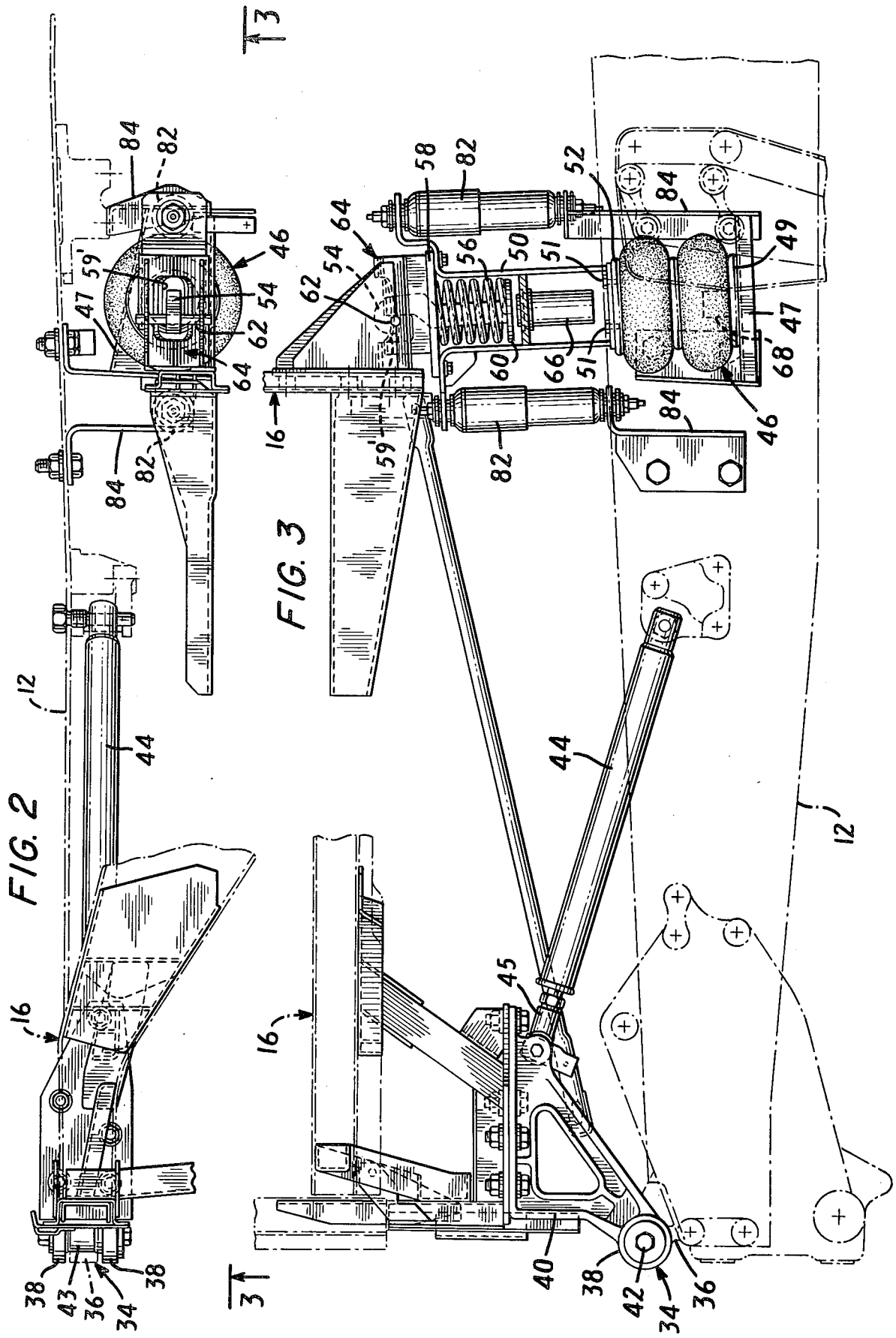

VEHICLE CAB MOUNTING ARRANGEMENT

BACKGROUND OF THE INVENTION

The driver and other occupants of a cab of a vehicle, such as a tractor for a semitrailer, should be protected or isolated from unnecessary physical disturbances to improve their comfort and safety. Such disturbances as noise, heat and rough rise cause the occupants of a vehicle to tire more readily, thus making them less comfortable and reducing the alertness of the driver to possible hazardous conditions. Vertical movement of the cab due to irregularities in the roadway surface must be expected to some degree, and it has been found that the human body can tolerate an appreciable amount of such vertical movement without pain or discomfort. On the other hand, fore and aft movement in a horizontal plane cannot be tolerated to the same degree by the human body and often results in soreness or at least early fatigue. The disturbing effects of fore and aft movement are especially felt by an occupant of a sleeper berth in the cab and may actually prevent sleep, inasmuch as that occupant derives no benefit from a driver's suspension seat.

Due to the physical characteristics of typical semitrailer vehicles, irregularities in the road surface cause not only vertical movement of the tractor cab but also considerable fore and aft movement. This fore and aft movement may be produced by pitching of the tractor directly induced by road irregularities and often compounded by a reaction to similar pitching action of the attached semitrailer. Fore and aft movement may also be the result of resonant vibration of the frame induced by eccentricity or unbalance of the rolling assembly (i.e. tires, wheels and brake drums) for the vehicle or by resonant pitching of the semitrailer.

Past efforts to achieve significant ride improvement by modifying chassis suspension systems have had limited success. Chassis suspensions having relatively low spring rates are capable of isolating road irregularities to a greater degree than conventional suspension systems, but trailer induced pitch and reduced roll stability become more of a porblem with low spring rate suspensions. Tractor and trailer chassis suspension systems having relatively low spring rates are also more expensive to manufacture, heavier, and cost more to maintain than conventional suspension systems.

Another approach to eliminate the fore and aft movement of a truck cab is to mount the cab on the frame so as to isolate the cab from the frame, and, in particular, from the resonant vibrations of the frame. Since resonant vibration is generally manifested in beam-like flexure about one or more nodal points, it has previously been proposed to mount a truck cab on a frame at a node point near the front of the frame. Thus, no vertical movement is transmitted to the cab from the frame at that mounting. A second mounting for the cab, spaced longitudinally of the frame from the node point, is constructed so as to isolate the cab from at least vertical movement of the frame at the second mounting. The second mounting may be, for example, a loose slide fitting or a resilient, spring mounting.

The general principles of cab isolation presented above are outlined in a pamphlet entitled "Truck Ride Guide" by William F. LeFevre, published in 1967 and copyrighted by Rockwell-Standard Corporation of Detroit, Michigan. Specific embodiments of these general principles are described and illustrated in the De Haan U.S. Pat. No. 3,010,757, the Fisher U.S. Pat. No. 3,276,812 and the Harbers U.S. Pat. No. 3,361,444, for example.

SUMMARY OF THE INVENTION

The present invention is directed to an arrangement for mounting a vehicle cab on a frame so as to moderate objectionable fore and aft motion of the cab in a manner that is in direct opposition to conventional cab mounting techniques. According to the invention, in a vehicle having a frame capable of vibratory, beam-like bending about at least one nodal point, at least one support element resiliently mounts the cab on tthe frame at or near a nodal point. A set of support elements located at a distance lengthwise of the frame from the first support element or elements secures the cab to the frame in a manner that transmits to the cab vibratory movement of the frame at the set of supports.

The novel mounting arrangement described above has been tested, in tractors hauliing semitrailers, for example, and found particularly effective in vehicles in which the cab is mounted on the frame so as to overlie the engine. In vehicles in which the cab overlies the engine, often referred to as "cab-overs", the front of the cab is pivotally mounted on the frame to enable the cab to be tilted and thereby permit access to the engine for inspection and repairs, for example. The pivotal mounting, functioning together with the resilient mounting at or near a frame nodal point, moderates fore and aft motion of the cab by permitting the cab to pivot relative to the frame and thereby avoid the fore and aft or rocking motion normally induced by vibratory beaming action of a frame in a cab rigidly secured to the frame. It has also been found that the combination of the pivotal mounting and the resilient mounting according to the invention is very effective in reducing the fore and aft motion of the cab produced by pitching of the tractor. The arrangement also moderates, to some extent, vertical motion of the cab due to tractor pitching and vibratory beaming action of the frame.

In a preferred embodiment of the invention, the inventive mounting arrangement is used in a tractor capable of hauling a semitrailer and having a cab mounted on the tractor frame to overlie the engine. The nodal point mounting for the cab includes two pneumatic springs located one adjacent each side of the rear portion of the cab and at least one shock absorber located adjacent each of the pneumatic springs. Each shock absorber is connected at one end to the frame and is coupled to the cab at its other end when the cab is in its normal "down" position and acts to prevent excessive movement of the cab with respect to the frame and to provide viscous damping. The pneumatic springs are supplied with air under pressure from an appropriate source, such as the chassis air reservoir, and the flow of air to and from the springs is controlled by a leveling valve. The valve adjusts the air pressure within the springs in response to changes in the static loading on the springs and thereby maintains the rear portion of the cab adjacent the two springs at a relatively constant vertical position above the frame despite changes in the static loading of the cab.

A safety valve is also provided in the line leading from the air reservoir to the pneumatic springs so that when the air pressure in the reservoir drops below a predetermined pressure, the flow of pressurized air to the springs is interrupted so as to maintain adequate air pressure for operating other pneumatic devices, such as pneumatic brakes. Each of the pneumatic springs also includes a resilient stop, which acts to support the cab in the event of failure of the spring.

BRIEF DESCRIPTION OF THE DRAWINGS

For a better understanding of the invention, reference may be made to the following description of an exemplary embodiment, taken in conjunction with the figures of the accompanying drawings, in which:

FIG. 1 is a side elevational view of a tractor for hauling a semitrailer and having a cab mounted according to the present invention;

FIG. 2 is a plan view on an enlarged scale of a left-side portion of the cab mounting in the tractor illustrated in FIG. 1;

FIG. 3 is a side elevational view taken along the line 3—3 of FIG. 2 and looking in the direction of the arrows;

FIG. 4 is a plan view on an enlarged scale of a right-side portion of the cab mounting in the tractor of FIG. 1; and FIG. 5 is a view taken along the line 5—5 of FIG. 4 and looking in the direction of the arrows.

DESCRIPTION OF AN EXEMPLARY EMBODIMENT

FIG. 1 illustrates a tractor 10 capable of hauling a conventional semitrailer (not shown). One or more axles support the rear of the semitrailer and a fifth wheel assembly (not shown) enables the semitrailer to be coupled to the tractor 10. The tractor 10 includes a frame 12, an engine 14 mounted on the frame adjacent the forward end, and a cab 16 also mounted on the frame at the forward end and overlying the engine. The frame 12 is carried on a single front axle 18 and dual rear axles 20, each mounting at least two wheels 22.

The frame 12 is capable of vibratory, beam-like bending about one or more nodal points. In FIG. 1, the vibratory movement is illustrated to an exaggerated extent by the phantom lines 24 and 26, which designate the limits of the beaming movement. (For simplicity, the effects of tractor pitching are not illustrated.) As can be seen, there is a point 28 along the length of the frame 12 at which, theoretically at least, no vertical deflection occurs during the beaming motion and this point 28 is designated the node or nodal point. While the bending action of the frame 12 produces essentially vertical deflection of the frame, normally in the range of one inch or less in each vertical direction, any structure, such as the cab, which extends above the forward portion of the frame and is rigidly secured thereto will move not only vertically, but also fore and aft, as can be seen by considering the relative horizontal positions of corresponding points along the phantom lines 30 and 32, which represent locations above the frame in a cab rigidly fixed to the frame and illustrate the objectionable backslapping action caused by the back of the driver's seat (not shown), for example. The present invention is directed toward moderating, if not eliminating, the fore and aft motion of the cab as well as reducing the vertical deflection of the cab in response to vibratory movement of the frame 12 and pitching of the tractor 10.

According to the invention, the cab 16 is mounted on the frame 12 at two locations along the length of the frame. Specifically, the cab 16 is coupled to the frame 12 at the front thereof by a pair of spaced pivotal mounts 34, one of which is shown in detail in FIGS. 2 and 3. Each mount 34 includes a single eye or knuckle 36 secured to and extending above the frame 12 (shown in phantom in FIGS. 2 and 3). The frame knuckle 36 fits between a pair of spaced apart knuckles 38 formed on a bracket 40 secured to the bottom of the front of the cab 16. The frame and cab knuckles 36 and 38, respectively, are held together and in alignment by a bolt 42, about which the cab 16 may be tilted.

Between each frame knuckle 36 and bolt 42 is a bushing assembly 43 consisting of two metal tubes separated by a tube of injection molded urethane. The urethane tube is bonded to the inner metal tube, while a lubricating medium is applied between the urethane tube and the outer metal tube. Each bushing assembly 43 thus affords a permanently lubricated pivotal mount for the front of the cab 16.

While the urethane tube of each bushing 43 has some minimal inherent resilience, it is only about 0.09 inch thick and has a very high spring rate of about 50,000 pounds per inch of deflection. Accordingly, there is essentially no resilience in the pivotal mounts 34, which thus transmit to the cab the movement of the frame 12 at the mounts 34.

The pivotal mounts 34 enable the cab 16 to be tilted up and to the left, as viewed in FIG. 1, to facilitate access to the engine 14 for repairs, for example. The tilting action is achieved by pressurizing a pair of hydraulic cylinder 44, each of which is coupled to the frame 12 and receives a piston (not shown) that is coupled to the corresponding bracket 40 by a piston rod 45. The piston rod 45 is slotted (not shown) so as to provide a loose fit between the rod and the bracket 40, in order that the hydraulic cylinder system 44 is not a part of, and does not affect, the cab mounting system. The cylinders 44, like the mounts 34, are located one at each side of the cab 16 and the frame 12.

The cab 16 is resiliently mounted on the frame 12 at the node or nodal point 28 of the beam vibratory motion. At the node point 28, two conventional pneumatic springs or air bags 46 are located one at each side of the cab 16. The lower end of each pneumatic spring 46 is secured to a bracket 47 by a plurality of bolts 48 that are threadedly received in blind nuts (not shown) formed in the bottom plate 49 of each spring. Each bracket 47 is bolted to a corresponding outer side of the frame 12. At its upper end, each pneumatic spring 46 is secured to the lower end of a bracket 50 by a plurality of bolts 51 screwed into blind nuts (not shown) formed in the top plate 52 of each spring. The upper end of each bracket 50 mounts a retaining hook 54 that is spring loaded by a spring 56. One end of each spring 56 butts against a guide plate 58 spanning the top of the bracket 50, the plate 58 being formed with apertures 59 and 59' through which the hook 54 extends, while the lower end of each spring 56 engages a plate 60 secured to the lower end of the hook 54, the spring biasing the hook downwardly as viewed in FIGS. 3 and 5. Each hook 54 engages a bar 62 carried by a corresponding bracket 64 that is secured to the cab 16, as shown in FIG. 3, to hold the rear of the cab adjacent the frame 12. Each spring 56 can be compressed by a piston (not shown) received in a hydraulic cylinder 66 mounted on each bracket 50 so as to disengage the hooks 54 from the bars 62 and permit the cab 16 to be tilted forward by the hydraulic cylinder assemblies 44.

The pneumatic springs or air bags 46 provide the primary resilient support for the rear of the cab 16. Since fore and aft pitching movement of the cab generally occurs with a frequency of four to six cycles per second, the air springs 46 preferably have a natural frequency of about one and a half cycles per second. This relatively low natural vibrational frequency contrasts with conventional cab mounts having natural frequencies of at least eight cycles per second and promotes the isolation of the cab from the vibrations of the frame 12. An air spring which may be used in the invention is the Firestone Model 26C air spring. Under a typical static cab load of about 500 pounds, the air springs deflect about one inch in compression and five-eighths inch in extension when the tractor in which they are installed travels over typical road surfaces. As a backup, in case the springs 46 should fail, each spring includes a resilient bump or safety stop 68.

As shown in FIG. 1, pressurized air is supplied to the pneumatic springs 46 from the chassis air reservoir 70 through a pneumatic line 72. At the end of the line 72, near the pneumatic spring 46 at the right side of the cab 16 (see FIGS. 4 and 5), there is provided a conventional leveling valve 74. The valve 74 can be manually adjusted, as is well known to those skilled in the art, to set a desired height for the air springs 46 within a range of from 6.25 inches to 8.75 inches, for example. Thereafter, the leveling valve 74 automatically controls the flow of air to and from each pneumatic spring 46 through a respective pneumatic line (not shown) so as to adjust the pressure within the springs in response to changes in the static loading of the cab and the springs to maintain the rear of the cab 16 at a relatively constant vertical position relative to the frame 12 despite changes in the static loading of the cab.

The leveling valve 74 is mounted on a bracket 75 that is secured to the frame 12 and is coupled to an actuating rod 76, which is pivotally connected at its upper end to the bracket 50, so that the rod follows the vertical motion of the cab 16 when the cab is in its normal down position, in which the guide plate 58 engages the bracket 64. The lower end of the rod 76 is pivotally connected to an arm 78 extending from the valve 74. Since the upper end of the rod 76 follows the vertical movements of the cab 16, the rod causes the arm 78 to pivot up or down according to the movement of the cab 16 relative to the frame 12. Upward pivotal movement of the arm 78 causes air to be exhausted from the air springs 46, while downward movement causes air to be supplied to the air springs, the leveling valve 74 being of the delayed action type, however, so as to be responsive only to prolonged changes in displacement of the cab 16 relative to the frame 12 due to changes in the static loading of the cab. Typical air spring and leveling valve arrangements are described and illustrated in the Harbers U.S. Pat. No. 3,361,444 and the Fischer et al. U.S. Pat. No. 3,442,502. The pertinent portions of both patents are incorporated by reference herein as necessary to facilitate an understanding of the leveling valve 74.

Also in the pneumatic line 72 is a safety valve 80 that is responsive to the air pressure in the reservoir 70. If the reservoir pressure drops below a predetermined value, the valve 80 closes the line 72 so as to maintain sufficient pressure in the reservoir to operate pneumatic brakes (not shown) and other pneumatic systems so that the vehicle can be taken to a service center. Thus, the safety valve 80 prevents total failure of all pneumatic systems in the tractor 10 in the event of a leak or similar failure in the cab suspension air system.

Two conventional shock absorbers 82 are mounted adjacent each air spring 46. Each shock absorber 82 is secured at its lower end to a corresponding bracket 84 that is bolted to the frame 12, while the upper end of each shock absorber is secured to the upper end of the bracket 50. The shock absorbers 82 provide viscous damping to prevent cab resonance at the resonant frequency of the air bag isolation system and also slow cab motion after harsh road disturbances, as well as providing compression and rebound stops. In the event of a frontal collision, the shock absorbers also limit the extent of cab excursion and thus act as safety links across the cab isolation elements or air springs 46.

As indicated previously, the mounting arrangement described above has been found to be particularly effective in eliminating discernable fore and aft motion in the cabs of vehicles such as cab-over tractors for semitrailers, while also reducing vertical harshness. While the embodiment described above incorporates air springs for the nodal point mounting, other resilient elements having the desired low spring rate may be used in the nodal point mounting.

It will be understood that the embodiment described above is merely exemplary and that persons skilled in the art may make many variations and modifications without departing from the spirit and scope of the invention. For example, a single air spring or equivalent resilient element could be located at or near the nodal point on the longitudinal center line of the cab, or such a central air spring could be employed in addition to an air spring adjacent each side of the cab, provided that the nodal point mounting has the desired low spring rate. Also, instead of including a resilient stop in each air spring, such stop could be incorporated in one or all of the shock absorbers or could be provided in a separate assembly. All such modifications and variations are intended to be within the scope of the invention as defined in the appended claims.

We claim:
1. In a tractor adapted to be coupled to a semitrailer, the tractor having a frame capable of vibratory, beam-like bending about at least one nodal point, an engine mounted on the frame, a cab mounted on the frame to overlie the engine, and a reservoir adapted to contain air under pressure, the improvement comprising:
 a. first support means for resiliently mounting a rear portion of the cab on the frame substantially at the nodal point, the first support means including a pneumatic spring mounted at one end to the frame and being adapted for coupling at the other end to the cab, the pneumatic spring having a natural frequency of about one and a half cycles per second, and two shock absorbers located adjacent the pneumatic spring at opposite sides thereof, each shock absorber being mounted at one end to the frame and being coupled at the other end to the end of the pneumatic spring remote from the frame;
 b. means communicating the reservoir with the pneumatic springs for conducting pressurized air from the reservoir to the pneumatic springs, the conducting means including leveling valve means for controlling the flow of air to and from the pneumatic spring so as to adjust the air pressure within the spring and maintain the rear portion of the cab adjacent the spring at a relatively constant vertical position relative to the frame despite changes in static loading of the cab; and c. second support means for securing a front portion of the cab to the frame so as to permit pivotal movement of the cab relative to the frame about an axis extending transversely of the frame, the second support means transmitting to the cab vibratory movement of the frame at the second support means, the second support means being located at the front end of the frame and spaced longitudinally of the frame from the first support means.

2. The improvement of claim 1, wherein the first support means includes two pneumatic springs located one adjacent each side of the cab.

3. The improvement of claim 2, wherein the conducting means also includes safety valve means for controlling the flow of air from the reservoir to the pneumatic springs, the safety valve means being responsive to the pressure of the air in the reservoir and being adapted to interrupt air flow to the pneumatic springs if the pressure in the reservoir is less than a predetermined value.

4. The improvement of claim 2, wherein each of the pneumatic springs includes a resilient stop member to support the cab in the event of failure of the pneumatic spring.

* * * * *